(12) United States Patent
Alderson

(10) Patent No.: US 8,130,128 B2
(45) Date of Patent: Mar. 6, 2012

(54) SYSTEM AND METHOD FOR GENERATING SHAPED NOISE

(75) Inventor: Jeff D. Alderson, Driftwood, TX (US)

(73) Assignee: Silicon Laboratores Inc., Austin, TX (US)

( * ) Notice: Subject to any disclaimer, the term of this patent is extended or adjusted under 35 U.S.C. 154(b) by 168 days.

(21) Appl. No.: 12/798,092

(22) Filed: Mar. 30, 2010

(65) Prior Publication Data

US 2011/0241919 A1 Oct. 6, 2011

(51) Int. Cl.
H03M 1/82 (2006.01)

(52) U.S. Cl. ........................................ 341/152; 375/243

(58) Field of Classification Search .................. 341/152, 341/120, 118, 143; 375/243, 244, 245, 346, 375/350; 332/107, 109
See application file for complete search history.

(56) References Cited

U.S. PATENT DOCUMENTS

| 5,014,016 | A | 5/1991 | Anderson |
| 5,247,581 | A | 9/1993 | Gurcan |
| 5,389,829 | A | 2/1995 | Milazzo |
| 5,672,998 | A | 9/1997 | Wittlinger |
| 5,798,672 | A | 8/1998 | Masini et al. |
| 6,097,249 | A | 8/2000 | Strickland et al. |
| 6,127,885 | A | 10/2000 | Colangelo |
| 6,160,455 | A | 12/2000 | French et al. |
| 6,297,692 | B1 | 10/2001 | Nielsen |
| 6,552,606 | B1 | 4/2003 | Veltman et al. |
| 6,552,607 | B1 | 4/2003 | Danielson |
| 6,563,377 | B2 | 5/2003 | Butler |
| 6,594,309 | B1 | 7/2003 | Botti et al. |
| 6,597,240 | B1 | 7/2003 | Walburger et al. |
| 6,653,897 | B2 | 11/2003 | Sawashi |
| 6,794,932 | B1 | 9/2004 | Butler |
| 6,847,257 | B2 | 1/2005 | Edwards et al. |
| 7,046,080 | B2 | 5/2006 | Watts et al. |
| 7,068,095 | B2 | 6/2006 | Bernardon |
| 7,078,964 | B2 | 7/2006 | Risbo et al. |
| 7,119,629 | B2 | 10/2006 | Nielson et al. |
| 7,142,049 | B2 | 11/2006 | Kirn |
| 7,142,050 | B2 | 11/2006 | Risbo |
| 7,190,224 | B2 | 3/2007 | Sutardia |

(Continued)

OTHER PUBLICATIONS

Kempski et al., "Decomposition of EMI Noise Into Common and Differential Modes in PWM Inverter Drive System", Electrical Power Quality and Utilisation, Journal, vol. XII, No. 1, 2006, 6 pgs.

(Continued)

Primary Examiner — Joseph Lauture
(74) Attorney, Agent, or Firm — O'Keefe, Egan, Peterman & Enders LLP

(57) ABSTRACT

In a particular embodiment, a circuit device is disclosed that includes a data generator adapted to output a random pulse sequence having a particular spectral shape. The data generator includes a feedback loop with a transfer function, the output of which may be altered by limiter circuitry to increase stability of the data generator. The circuit device may further include, for example, a pulse edge control circuit to selectively apply a carrier suppression operation to at least one pulse-width modulated (PWM) signal in response to the random pulse sequence to produce at least one modulated PWM output signal. In such an example, the spectral energy associated with a PWM carrier of the modulated PWM output signal at a carrier frequency and associated harmonics is changed such that the modulated PWM output signal has a spectral shape defined by the particular spectral shape.

17 Claims, 10 Drawing Sheets

U.S. PATENT DOCUMENTS

| | | |
|---|---|---|
| 7,218,173 B2 | 5/2007 | Nalbant |
| 7,230,485 B2 | 6/2007 | De Cremoux et al. |
| 7,242,248 B1 | 7/2007 | Sutardja |
| 7,262,658 B2 | 8/2007 | Ramaswamy et al. |
| 7,279,965 B2 | 10/2007 | Hansen et al. |
| 7,298,209 B1 | 11/2007 | Sutardja |
| 7,301,417 B2 | 11/2007 | Shinohara |
| 7,332,962 B2 | 2/2008 | Wu et al. |
| 7,561,002 B1 | 7/2009 | Hariton et al. |
| 7,598,895 B1 | 10/2009 | Khoury |
| 7,894,536 B2 * | 2/2011 | Risbo et al. .................. 375/243 |
| 2003/0020539 A1 | 1/2003 | Sawashi |
| 2003/0067348 A1 | 4/2003 | Butler |
| 2003/0122615 A1 | 7/2003 | Zeff |
| 2004/0169552 A1 | 9/2004 | Butler |
| 2004/0232978 A1 | 11/2004 | Easson et al. |
| 2004/0232979 A1 | 11/2004 | Edwards et al. |
| 2005/0054307 A1 | 3/2005 | Watts et al. |
| 2005/0083114 A1 | 4/2005 | Risbo |
| 2005/0083115 A1 | 4/2005 | Risbo |
| 2005/0083116 A1 | 4/2005 | Risbo et al. |
| 2005/0099231 A1 | 5/2005 | Sutardja |
| 2005/0116770 A1 | 6/2005 | Kirn |
| 2005/0200404 A1 | 9/2005 | Bernardon |
| 2006/0008095 A1 | 1/2006 | Tsuji |
| 2006/0077007 A1 | 4/2006 | De Cremoux |
| 2006/0103458 A1 | 5/2006 | Hansen et al. |
| 2006/0226904 A1 | 10/2006 | Nalbant |
| 2006/0279354 A1 | 12/2006 | Hansen et al. |
| 2007/0002943 A1 | 1/2007 | Midya |
| 2007/0024365 A1 | 2/2007 | Ramaswamy et al. |
| 2007/0146069 A1 | 6/2007 | Wu et al. |
| 2007/0229159 A1 | 10/2007 | Krishnan et al. |
| 2008/0042743 A1 | 2/2008 | Wong et al. |
| 2009/0243688 A1 | 10/2009 | Khoury et al. |
| 2009/0243744 A1 | 10/2009 | Beale et al. |
| 2009/0243745 A1 | 10/2009 | Alderson et al. |
| 2009/0309654 A1 | 12/2009 | Khoury |

OTHER PUBLICATIONS

Wikipedia, "Pseudorandom Number Generator", Printed From Internet Feb. 17, 2010, 7 pgs.

Ogasawara et al., "Suppression of Common-Mode Voltage in a PWM Rectifier/Inverter System", IEEE, 2001, 7 pgs.

* cited by examiner

SYSTEM AND METHOD FOR GENERATING SHAPED NOISE

FIELD OF THE INVENTION

This disclosure generally relates to a system and method of generating shaped noise that may be used, for example, in shaping a common mode spectrum in pulse-width modulated (PWM) amplifiers.

BACKGROUND OF THE INVENTION

Conventionally, class D audio amplifiers have the benefit of high power efficiency, but such amplifiers can also have a drawback in terms of electromagnetic interference (EMI), which can interfere with nearby wireless receivers, violate Federal Communication Commission (FCC) emission limits, or any combination thereof. Audio Class D amplifiers often switch at a frame rate of a few hundred kHz, and common mode energy at a carrier frequency and its harmonics can fall directly in the amplitude modulated (AM) radio frequency band, interfering with nearby AM receivers.

FIG. 1 illustrates a graph 100 of a "BD modulation" employed by many class D amplifiers. Class D type BD modulation varies pulse widths of two pulse waves that are time-aligned and often nominally centered within a pulse-width modulated (PWM) frame, which has a frame width (T). For positive input signals, the pulse width PWM B signal 102 that drives the high side of the bridged output (typically referred to as a P or B pulse) is increased (such as by a delta ($\Delta$)) while the pulse width of PWM D signal 104 that drives the low side of the bridged output (typically referred to as an N or D pulse) is decreased (such as by the delta ($\Delta$)). For negative PWM input signals, a width of the PWM D (or N) signal 104 is increased while the width of the PWM B (or D) signal 102 is decreased, resulting two similar but negative differential pulses. Differentially, this is an efficient arrangement since there is no wasted differential energy.

In this example, a differential mode signal 106 includes pulses that are nominally centered at $\pm T/4$, where T is the width of the PWM frame and the reference time position T=0 represents the center of the frame. The differential mode signal 106 is applied across the load (such as a filter in cascade with a speaker). The carrier frequency of the differential mode signal 106 is at twice the PWM frame rate. However, the common mode signal 108 has a peak energy that is nominally centered at the PWM frame rate. Carrier energy of the common mode signal 108 can interfere with nearby circuitry or radio receivers.

FIG. 2 illustrates a graph of a resulting differential mode power spectrum 200 at the output of an associated H-bridge circuit. As shown, the graph 200 illustrates the differential mode component at twice the frame rate in the frequency domain, where the frame rate is 960 kHz.

FIG. 3 illustrates a graph of a resulting common mode power spectrum 300 at the output of an associated H-bridge circuit, showing a common mode component at the frame rate of 960 kHz. The strong common mode component created at the PWM frame rate, as illustrated by the common mode power spectrum 300, can interfere with nearby radio receivers. Given that practical switching frequencies for audio applications range from approximately 200 kHz to 1000 kHz and that the AM band ranges from 520 kHz to 1710 kHz, there is a problem with radiated interference of the common mode carrier and its harmonics interfering with reception of an AM receiver in close proximity to or within the same system. Therefore, it is desirable to suppress the common mode carrier of a class-BD double sided symmetrical modulated signal with little or no compromise in the differential mode performance.

SUMMARY OF THE INVENTION

In a particular embodiment, a circuit device is disclosed that includes a data generator adapted to output a random pulse sequence having a particular spectral shape. The data generator includes a feedback loop with a transfer function, the output of which may be altered by limiter circuitry to increase stability of the data generator. In one embodiment, the limiter circuitry may be implemented as limiter circuitry that acts to limit the output signal of the transfer function to prevent relatively large error terms from being fed back to the input of the transfer function via the feedback loop.

The circuit device of this particular embodiment may further include a pulse edge control circuit to selectively apply a carrier suppression operation to at least one pulse-width modulated (PWM) signal in response to the random pulse sequence to produce at least one modulated PWM output signal. The spectral energy associated with a PWM carrier of the modulated PWM output signal at a carrier frequency and associated harmonics is changed such that the modulated PWM output signal has a spectral shape defined by the particular spectral shape. In a particular embodiment, the carrier suppression operation includes a phase shift operation that is applied to selectively shift the at least one PWM input signal by plus or minus a quarter of a PWM frame relative to the frame center according to the random pulse sequence. In another particular embodiment, the carrier suppression operation comprises a chop operation that is selectively applied to chop or not chop the at least one PWM input signal with its duty cycle complement PWM signal according to the random pulse sequence.

In another particular embodiment, a method is disclosed that includes receiving at least one pulse-width modulated (PWM) input signal from a PWM source and receiving a random pulse sequence having a particular spectral shape from a data generator that includes a feedback loop with a transfer function, the output of which may be altered by limiter circuitry such as described above to increase stability of the data generator. The method further includes applying a carrier suppression operation to selectively phase shift or to selectively chop the received at least one PWM input signal according to values of the random pulse sequence to produce at least one modulated PWM output signal with a desired spectral shape as defined by the random pulse sequence.

In one respect, disclosed herein is a circuit device, comprising: a data generator adapted to output a random pulse sequence having a particular spectral shape, the data generator including a sigma-delta modulator that includes a zero input signal, a random noise signal, a quantizer, a noise transfer function defined within a feedback loop, and limiter circuitry coupled within the feedback loop between the output of the feedback loop and the noise transfer function. A feedback value output by the feedback loop of the sigma-delta modulator is subtracted from the zero input signal of the sigma-delta modulator to produce a first result prior to addition of the random noise signal to the first result to produce a second result, the second result is provided to the quantizer of the sigma-delta modulator to produce a random pulse sequence at an output of the sigma-delta modulator, and the random pulse sequence is subtracted from the first result to produce a feedback result that is provided to the noise transfer function of the sigma-delta modulator.

In another respect, disclosed herein is a method comprising: providing a data generator comprising a sigma-delta modulator that includes a zero input signal, a random noise signal, a quantizer, a noise transfer function defined within a feedback loop, and limiter circuitry coupled within the feedback loop between the output of the feedback loop and the noise transfer function; and producing a random pulse sequence having a particular spectral shape from the data generator by subtracting a feedback value output by the feedback loop of the sigma-delta modulator from the zero input signal of the sigma-delta modulator to produce a first result prior to adding the random noise signal to the first result to produce a second result, providing the second result to the quantizer of the sigma-delta modulator to produce a random pulse sequence at an output of the sigma-delta modulator, subtracting the random pulse sequence from the first result to produce a feedback result, and providing the feedback result to the noise transfer function of the sigma-delta modulator.

DESCRIPTION OF ILLUSTRATIVE EMBODIMENTS

Figure 4:
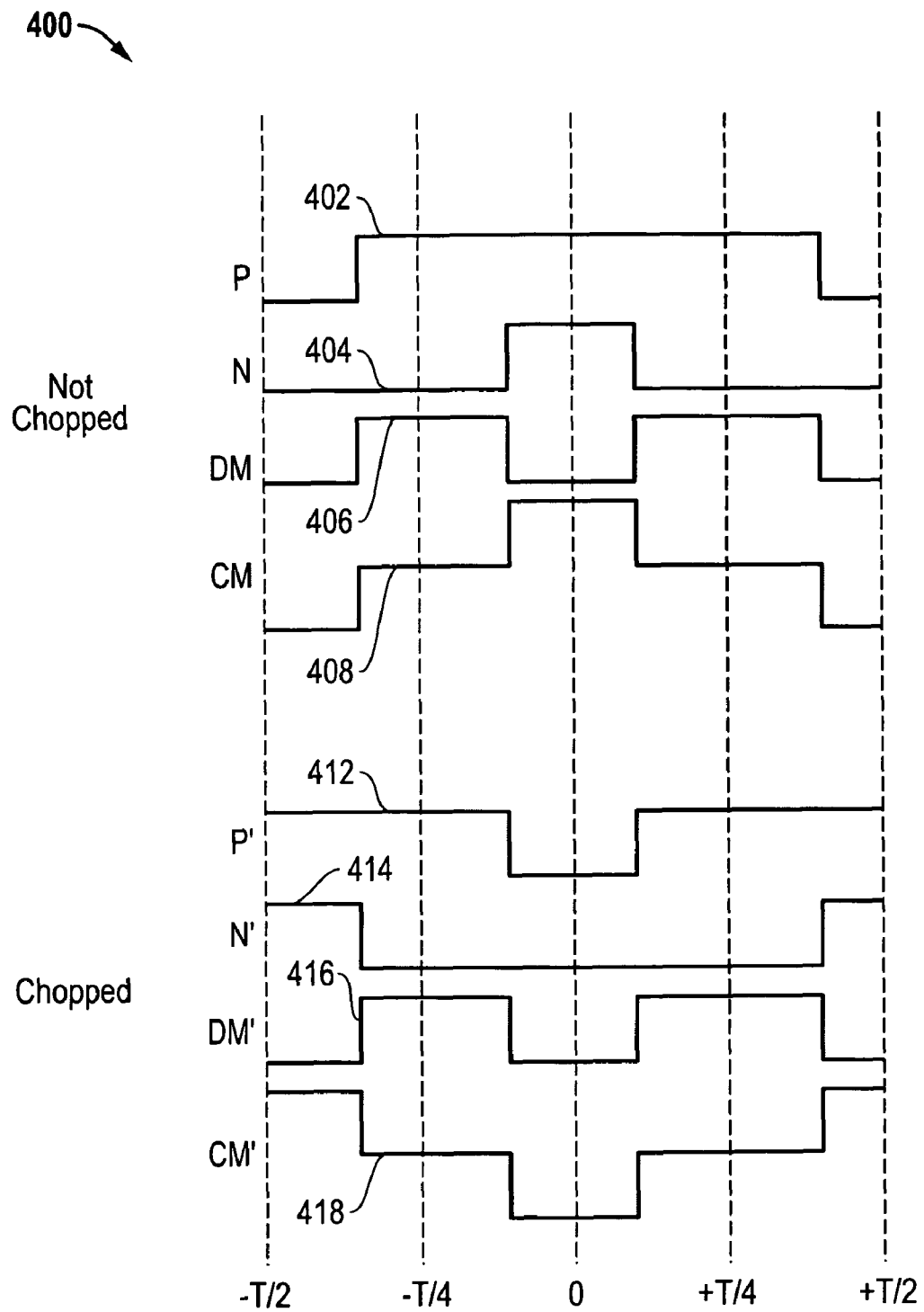
FIG. 4 is a timing diagram of a particular illustrative embodiment of a chop/no chop carrier suppression operation that can be selectively applied to suppress carrier power of a modulated PWM output signal and to spread carrier energy to frequencies other than the carrier frequency and its associated harmonics within a PWM output spectrum.

FIG. 4 is a timing diagram 400 of a particular illustrative embodiment of a chop/no chop carrier suppression operation that can be selectively applied to suppress carrier power of a modulated PWM output signal and to spread carrier energy to frequencies other than the carrier frequency and its associated harmonics within a PWM output spectrum. The timing diagram 400 includes a high side signal (P) 402 and a low side signal (N) 404, which have a differential mode component represented by signal 406 and a common mode component represented by signal 408. The differential mode signal 406 is defined by the following equation:

$$DM(t)=P(t)-N(t) \quad \text{(Equation 1).}$$

As shown, in the "not chopped" version, the common mode component (signal 408) has a peak amplitude centered at a center of the frame. The common mode signal 408 is defined by the following equation:

$$CM(t)=(P(t)+N(t))/2 \quad \text{(Equation 2).}$$

The timing diagram 400 also includes a chopped version of the high and low side signals (P and N) 402 and 404, represented by the high side signal (P') 412 and the low side signal (N') 414. In this example, the high side signal (P) 402 is inverted and swapped with the low side signal (N) 404 and becomes the low side signal (N') 414, as shown by the following equation:

$$N'(t)=-P(t) \quad \text{(Equation 3).}$$

The low side signal (N) 404 is inverted and swapped with the high side signal (P) 402 becomes the high side signal (P') 412, as shown by the following equation:

$$P'(t)=-N(t) \quad \text{(Equation 4).}$$

In the chopped version, the differential mode signal 416 remains unchanged relative to the "not chopped" version, as defined by the following equation:

$$DM'(t)=P'(t)-N'(t)=-N(t)--P(t)=DM(t) \quad \text{(Equation 5).}$$

However, the common mode signal 418 is inverted relative to the common mode component of the "not chopped" version represented by the signal 408, as defined by the following equation:

$$CM'(t)=(-N(t)-P(t))/2=-CM(t) \quad \text{(Equation 6).}$$

In this example, when the signal is chopped, the common mode signal 418 is inverted and the differential mode signal 416 remains unchanged (relative to the differential mode signal 406). The differential mode signal 406 or 416 determines the audio performance in an audio application, and the common mode signal 408 is what is predominantly responsible for electromagnetic interference (EMI). In a particular embodiment, by selectively chopping and not chopping a PWM input signal and its duty cycle complement PWM signal, the common mode carrier energy at the carrier frequency is reduced over a sequence of frames, reducing EMI and radio frequency interference. As used herein, the term "duty cycle complement" refers to a signal that, when aggregated with the PWM input signal, aggregates to an entire width of the PWM frame (within limits of time quantization effects). Further, as used herein, the term "chop" or "chop operation" refers to a technique that inverts the PWM input signal and its duty cycle complement and interchanges them to produce a modulated PWM output. In a particular example, if the chop operation is alternately applied every other frame (e.g., a first PWM pulse is not chopped and a second PWM pulse is chopped), a resulting common mode carrier energy associated with the PWM P and N signals 402 and 404 (and their inverted and swapped (interchanged) versions PWM P' and N' signals 412 and 414) averages to zero at the carrier frequency.

Figure 5:
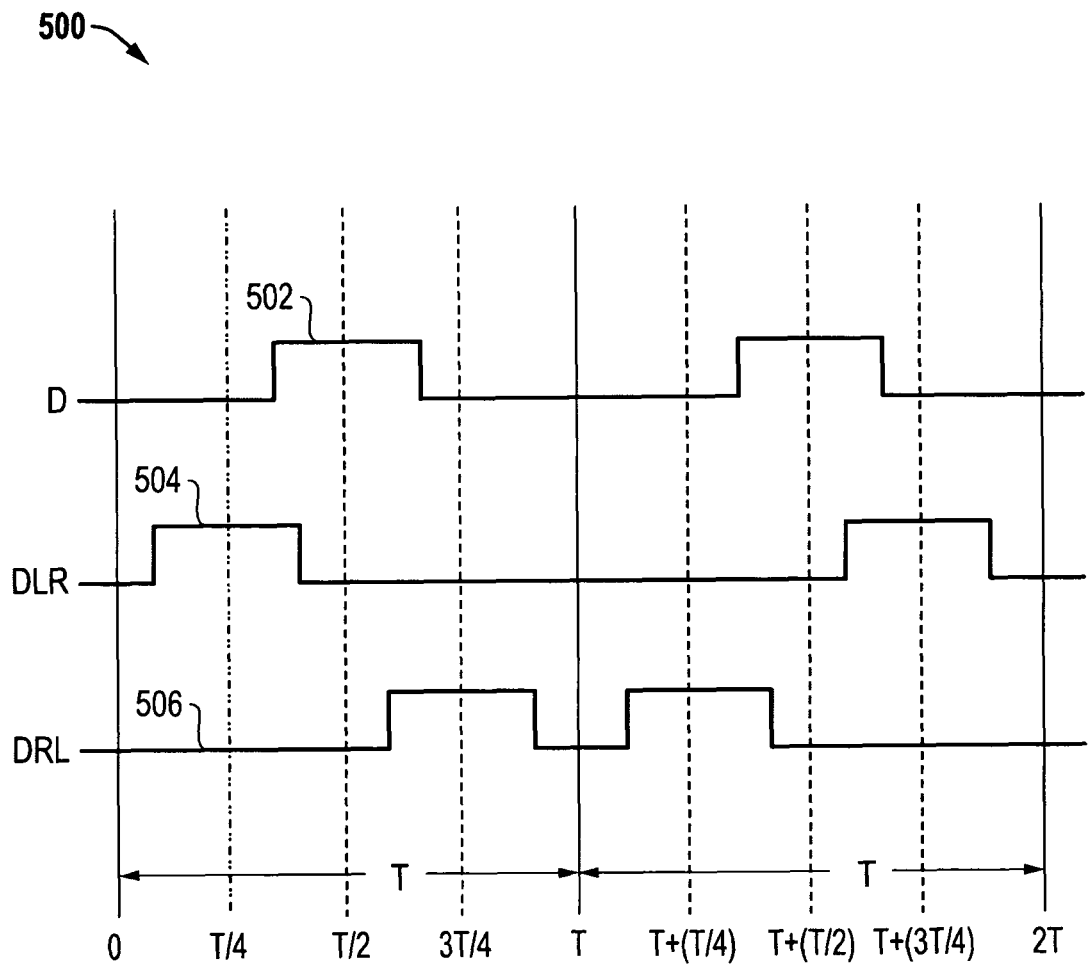
FIG. 5 is a graph of a particular illustrative embodiment of a timing diagram illustrating the basic concept for a quarter-frame phase shift of a single PWM signal to suppress a carrier at the frame rate.

FIG. 5 is a graph of a particular illustrative embodiment of a timing diagram 500 illustrating a quarter frame phase shift of a single pulse-width modulated (PWM) signal to suppress a carrier at the frame rate. The timing diagram 500 includes a PWM D signal 502 that is centered (positioned) within the frame at T/2. Over a two frame interval, the PWM D signal 502 is shifted. In one example, the PWM D signal 502 is shifted left (by −T/4) then right (by +T/4), as illustrated at 504. In another example, the PWM D signal 502 is shifted right (by +T/4) then left (by −T/4), as illustrated at 506.

In this particular example, the pulse width of the PWM D signal 502 is less than half of the frame width (T/2), so shifting the PWM D signal 502 early or late does not introduce any frame edge boundary issues. In other words, shifting of the PWM D signal 502 does not cause any portion of the pulse to cross the frame boundary (such as the PWM frame boundaries at T=0, T, or 2T, illustrated in FIG. 5). The above example represents a quarter-frame symmetrical pulse shift with no wrap-around.

However, when the pulse width is greater than T/2, then boundary problems can arise. For example, if the PWM D signal 502 is wider than T/2, shifting the PWM D signal 502 by a quarter of the frame width would cause a portion of the PWM D signal 502 to extend over the frame boundary (e.g., to cross t=0 or t=T). To avoid having the portion cross the frame boundary, the PWM D signal 502 can be shifted early (left) or late (right) by a phase that is less than a quarter of the frame, i.e., less than +T/4, so that the PWM D signal 502 abuts, but does not cross, the frame boundary. When two signals (a PWM D signal 502 that is wider than T/2 and a PWM B signal that is narrower than T/2) are shifted, both signals may be shifted to abut the frame boundary, such that the PWM D signal 502 is shifted by less than a quarter of the frame width and the PWM B signal is shifted by more than a quarter of the frame width. In this instance, the sum of the PWM D signal 502 and PWM B signal over two frames has zero content at the frame repetition rate in the Fourier Transform, which cancels the carrier in the common mode signal. This particular example can be referred to as a quarter frame asymmetrical pulse shifting with no wrap-around.

Alternatively, the PWM D signal 502 can be shifted by plus or minus a quarter of the frame, and any portion of the PWM D signal 502 that crosses the frame boundary can be wrapped to an opposing frame boundary within the same PWM frame. This alternative example can be referred to as a quarter-frame symmetrical pulse shift with wrap-around.

In a particular example, a pulse edge control circuit may be adapted to selectively apply a carrier suppression operation that includes selectively shifting one or more PWM signals by plus or minus a quarter of the frame width using quarter-frame symmetrical pulse shifting with no wrap-around, quarter-frame asymmetrical pulse shifting with no wrap-around, or quarter-frame symmetrical pulse shifting with wrap-around, depending on the implementation.

Figure 6:
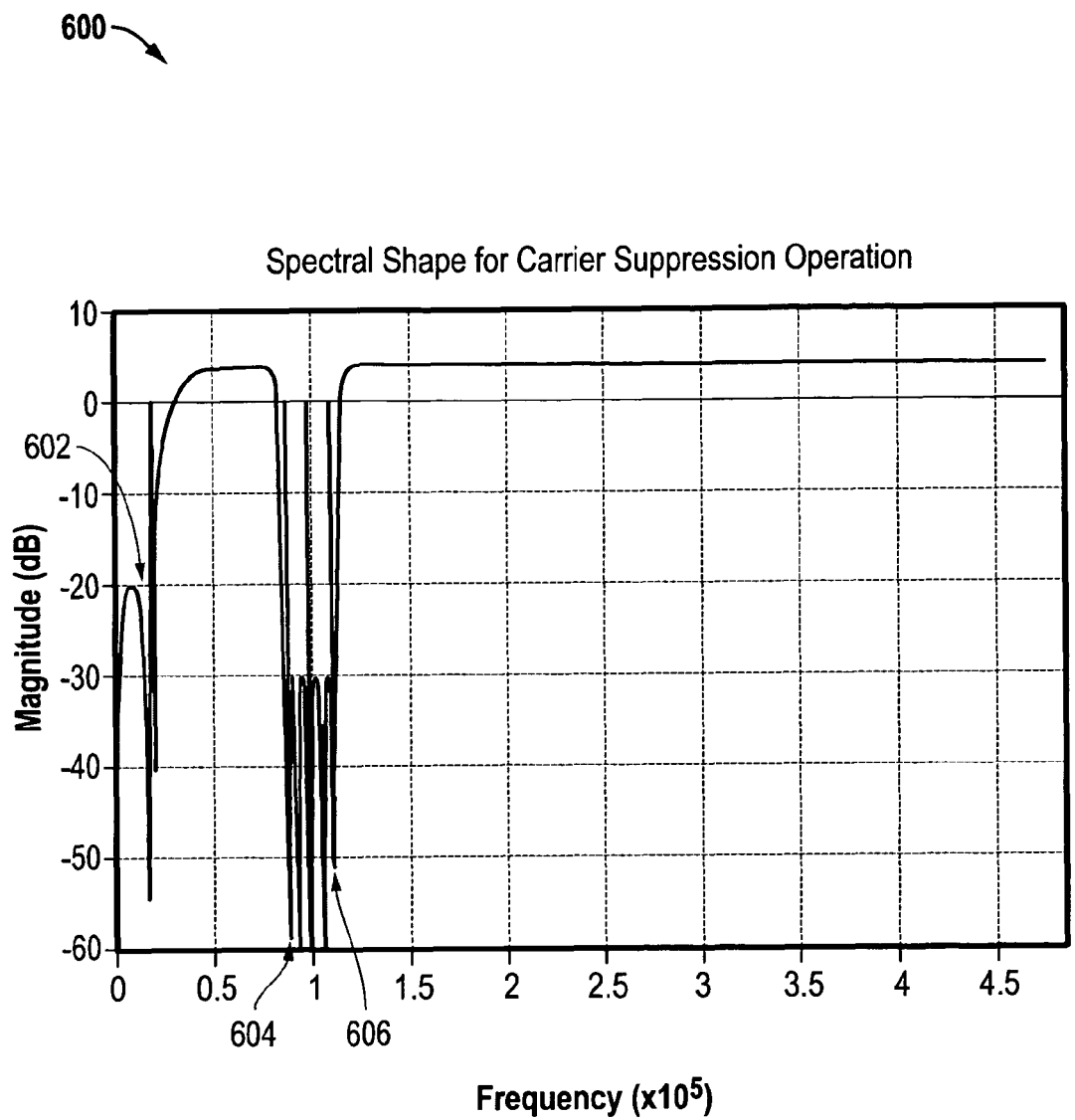
FIG. 6 is a graph of a particular illustrative embodiment of a spectral shape of a shaped random pulse sequence that can be used to shape a power spectrum of at least one PWM signal to produce at least one modulated PWM signal having a desired spectral shape.

FIG. 6 is a graph of an illustrative embodiment of a particular spectral shape 600 of a shaped random pulse sequence that can be used to define the power spectrum of at least one PWM input signal to produce at least one modulated PWM output signal having a desired spectral shape. The spectral shape 600 includes two band-stop regions, one with attenuation from 0-20 kHz resulting from nulls or notches at DC (0 kHz) and near 20 kHz (generally indicated at 602), and a second with attenuation around a selected frequency of interest resulting from nulls or notches at 200 kHz+/−10 kHz (generally indicated between 604 and 606). In a particular embodiment, it is desirable to suppress the large tone at the PWM frame rate and its harmonics to reduce peak radiated energy. In another particular embodiment, it is desirable to further attenuate spectral energy within a selected frequency band for improved AM radio reception. Further, in a particular embodiment, it is desirable to have little or no noise within a frequency band from approximately 0-20 kHz to prevent audible noise from coupling into a speaker in an audio application.

Figure 7:
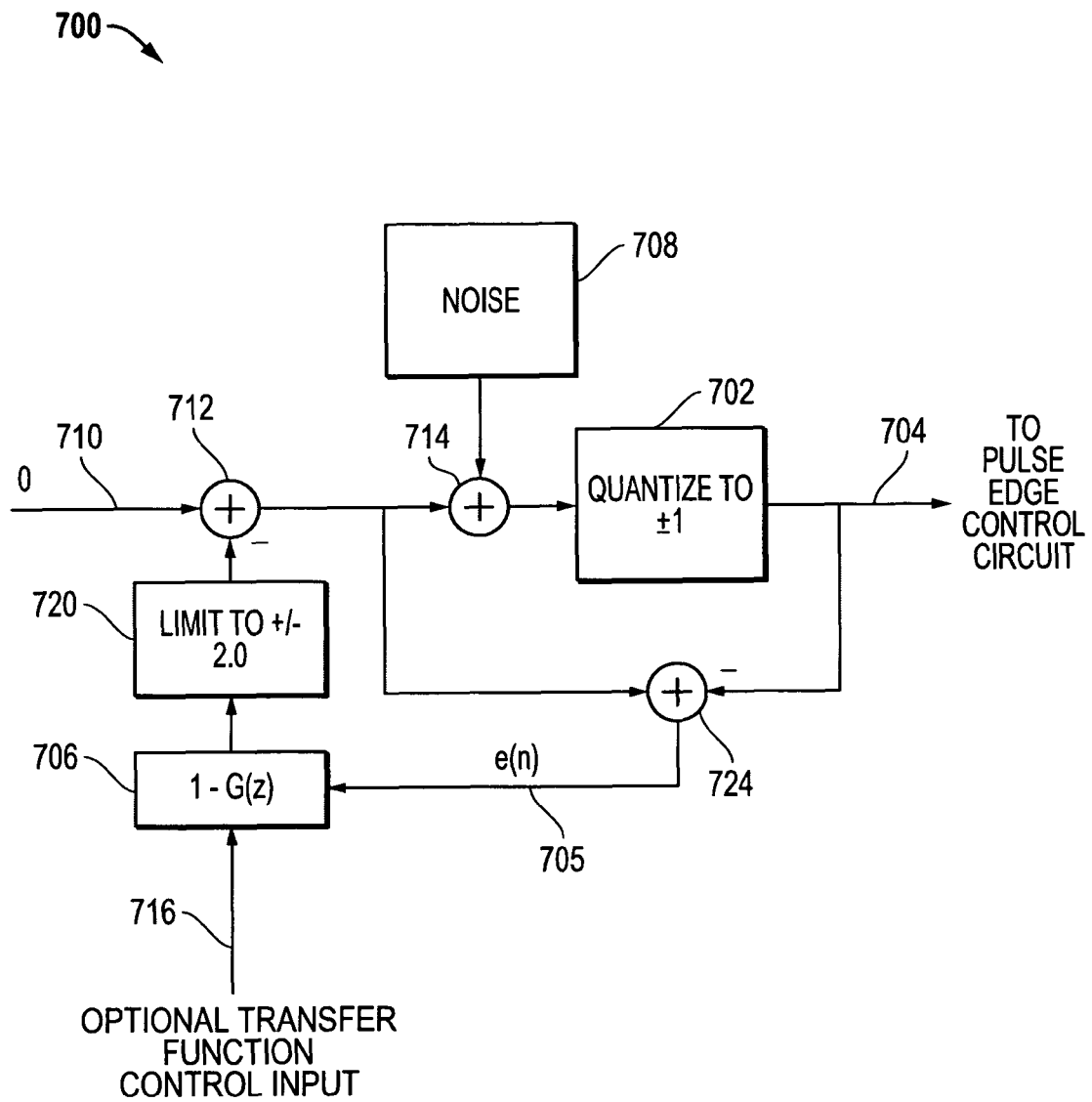
FIG. 7 is a block diagram of a particular illustrative embodiment of a sigma-delta circuit adapted for use as a shaped random pulse sequence generator that is programmable to produce a random pulse sequence having a particular spectral shape.

FIG. 7 is a block diagram of a particular illustrative embodiment of a sigma-delta circuit 700 adapted for use as a shaped random pulse sequence generator that produces a random pulse sequence having a programmable spectral shape, such as the particular spectral shape 600 illustrated in FIG. 6. In preferred embodiments, the stop-band at 200 kHz+/−10 kHz in FIG. 6 can be programmed for specific locations to reduce PWM radiation in desired frequency bands. The sigma-delta circuit 700 includes a quantizer 702 to produce a random pulse sequence having values of plus or minus one at an output 704. The sigma-delta circuit 700 further includes a feedback loop that has a transfer function (1-G(z)) 706. In this embodiment, the transfer function 706 is programmable via a transfer function control input 716 to alter the transfer function of the feedback loop. The sigma-delta circuit 700 includes a noise input 708 and a signal input 710 having a zero input value. Examples of suitable circuitry or algorithms for noise input 708 includes, but is not limited to, a 24 bit linear feedback shift register (LFSR) or other type of random or pseudo-random noise generation circuitry/algorithm, e.g., generalized feedback shift register, feedback with carry shift register, linear congruential generator, lagged Fibonacci generator, etc.

Still referring to FIG. 7, the signal input 710 is coupled to a first summing node 712 that produces a first result that is a difference between a feedback value received from limiter circuitry 720 and the zero input value. The first result is provided to a summing node 724, which subtracts a value at the output 704 from the first result to produce a feedback result that is provided to the transfer function 706. Additionally, the first result is provided to a second summing node 714, which adds the first result to a noise signal from the noise input 708 to produce a second result. The second result is provided to the quantizer 702.

In a particular embodiment, the sigma-delta circuit 700 can be implemented as digital circuits, analog circuits, firmware, or any combination thereof. In another particular embodiment, the transfer function 706 is configurable (programmable) via the transfer function control input 716 to produce a particular spectral shape, which may or may not have notches at particular frequencies. The random pulse sequence at the output 704 is consequently shaped by the transfer function 706. In one exemplary embodiment, the output 704 may be coupled to a pulse edge control circuit that is adapted to selectively apply a carrier suppression operation (such as a selective phase shift operation or a selective chop/no chop operation) according to values of the random pulse sequence. General information on a sigma-delta circuit adapted for use as a shaped random pulse sequence generator that produces a random pulse sequence having a programmable spectral shape with an output provided to a pulse edge control circuit may be found in U.S. patent application Ser. No. 12/208,535 by Alderson, et al. filed Sep. 11, 2008 (Publication No.: US 2009/0243745), which is incorporated herein by reference in its entirety.

In the exemplary embodiment of FIG. 7, limiter circuitry 720 is provided as shown at the output of transfer function 706 to limit the output signal of the transfer function 706 to decrease loop gain and prevent relatively large error terms in feedback loop from entering the input of the (1-G(z)) transfer function 706, regardless of how large the output is. This substantially prevents the loop from going unstable by limiting the output of transfer function 706, e.g., to a value of +2.0 or −2.0, and thus acts to limit the absolute value of the error term, |e(n)|, in feedback loop to less than or equal to one. Examples of limiter circuitry that may be provided at the output of transfer function 706 to limit size of error term |e(n)| in the feedback loop include, but are not limited to, hard soft limiting circuits, soft limiting circuits, piecewise linear transfer function limiting circuits, or any other circuitry that provides decreasing gain across the operating range.

It will be understood that zeroes in the transfer function 706 become poles in the transfer function response, and numerous close poles may have impulse response with large overshoot. Moreover, higher order (e.g., $13^{th}$ order) transfer functions tend to exhibit instability more often due to their larger impulse response and step response overshoot. Since quantizer 702 has an output of only +1 or −1, then loop gain may tend to decrease and stability decrease as error grows. Thus, a potential reason that a loop similar to that of circuitry 700 may go unstable in the absence of limiter circuitry 720 or other type of limiter circuitry is due to the non-linear nature of the quantizer 702, i.e., if the output of the transfer function 706 is larger than 1 then the effective loop gain drops. For example, if the output of the transfer function 706 is 2.5, the quantizer circuitry 220 can still only output 1.0, and the error e(n) would be −1.5 without limiter circuitry 230. In the absence of limiter circuitry 230, this relatively large error term e(n) would be input back into the transfer function 706 for the next time around the loop. Thus, the larger the output of the transfer function 706 without limiter circuitry 230, the larger the error term e(n), which is equivalent to the loop gain dropping.

In the embodiment of FIG. 7, output of limiter circuitry 720 may be modeled as noise on the input signal that passes directly onto the output signal 704 of circuitry 700 since the signal transfer function (STF) of (1-G(z)) transfer function 706 is equal to one. However, since the desired output 704 is shaped noise, this noise introduced by limiter circuitry 720 is acceptable as long as the power of the noise is below the amplitude of the notches in the shaped noise. In the exemplary embodiment of FIG. 7, the limiter circuitry 720 is set to limit the output of transfer function 706 at +/−2.0 to prevent the error term in feedback loop input to transfer function 706 from ever becoming larger than +/−1.0, thus creating a stable loop. This allows very high order loops to be provided with very aggressive NTF's for precisely shaped white noise. It will be understood that in other embodiments limiter circuitry may be provided that limits the output of transfer function 706 to other selected values, e.g., having absolute value greater than or less than 2.0.

For shaped chopping, the limiting action by limiter circuitry 720 may limit the depth of notches applied to the common mode spectrum during the chopping operation. Thus, it will be understood that in some cases it may be desirable to select the out-of-band (OOB) gain to be low enough such that limiter circuitry 720 will only be required to activate and limit the output of transfer function 706 relatively rarely, at the same time that the loop is made stable. In one exemplary embodiment, OOB may be selected to about 3.75 dB and limiter circuitry 230 may limit the output of transfer function 706 once about every 600 samples (−55 dB), although these values are exemplary only and greater or lesser values of OOB and/or limiting frequency may be implemented in other embodiments.

Figure 8:
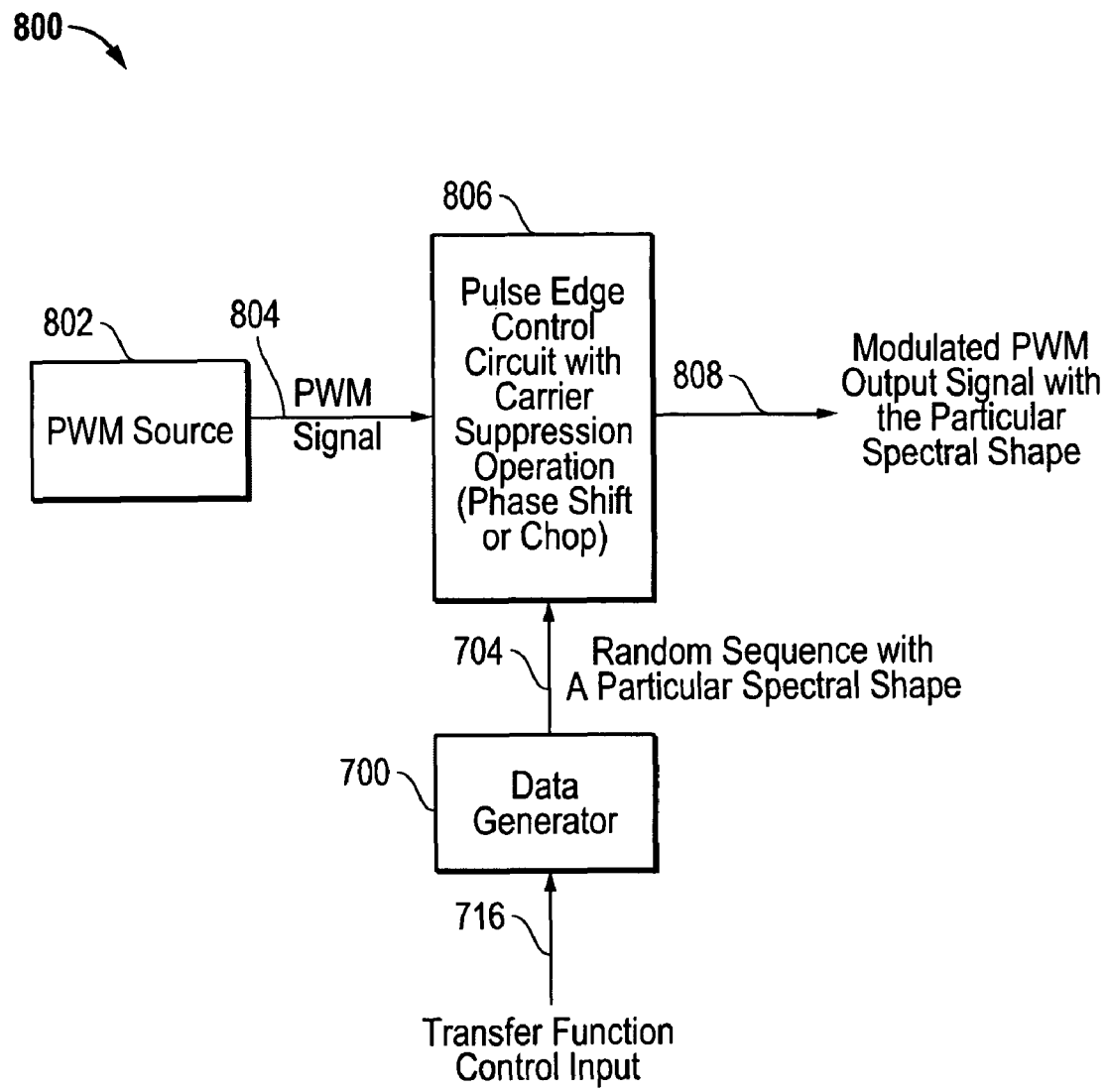
FIG. 8 is a block diagram of a system including a pulse edge control circuit that is responsive to a data generator, such as the sigma-delta circuit illustrated in FIG. 7, to selectively phase shift or to selectively chop at least one PWM signal according to values associated with the random pulse sequence to produce at least one modulated PWM output having the particular spectral shape.

FIG. 8 is a block diagram of a system 800 including a pulse edge control circuit 806 that is adapted to apply a carrier suppression operation to an input PWM signal according to values of a shaped random pulse sequence generator to produce at least one modulated PWM output having the particular spectral shape as defined by the data generator. The system 800 includes a pulse-width modulated (PWM) source 802 that provides at least one PWM signal 804 to a pulse edge control circuit 806. In this exemplary embodiment, the system 800 also includes the sigma-delta circuit 700 with limiter circuitry 720 illustrated in FIG. 7 that provides a random sequence with a particular spectral shape 704 to the pulse edge control circuit 806. The resulting output spectrum of signal 808 is effectively the convolution of the input PWM spectrum with the spectrum of the random pulse sequence.

In a particular example, the pulse edge control circuit 806 is adapted to selectively phase shift the at least one PWM signal 804 by plus or minus a quarter of a PWM frame width relative to a center of the PWM frame at integer sub-multiples of a frame repetition rate. In another particular example, the pulse edge control circuit 806 is adapted to selectively chop or not chop the at least one PWM signal 804. In a particular example, the shift or the chop can be selectively applied by the pulse edge control circuit 806 based on values of the random pulse sequence with the particular spectral shape 704. The resulting modulated PWM output signal has a suppressed carrier energy at the carrier frequency, which energy is spread to other frequencies and the overall spectral shape at 808 is defined by the spectral shape of the data generator output, 700.

FIG. 8 illustrates one exemplary embodiment in which sigma-delta circuit 700 of FIG. 7 may be employed to provide a random sequence with a particular spectral shape 704 to a pulse edge control circuit 806. However, it will be understood that the disclosed sigma-delta circuitry including limiter circuitry described herein may be employed to produce pseudo random noise having any desired spectrum and/or for other (e.g., non-PWM related) applications. Furthermore, it will be understood that both single bit and multiple bit shaped noise embodiments are possible, e.g., the disclosed sigma-delta circuitry including limiter circuitry may be implemented to generate multi-bit shaped noise of any desired spectrum.

Figure 1:
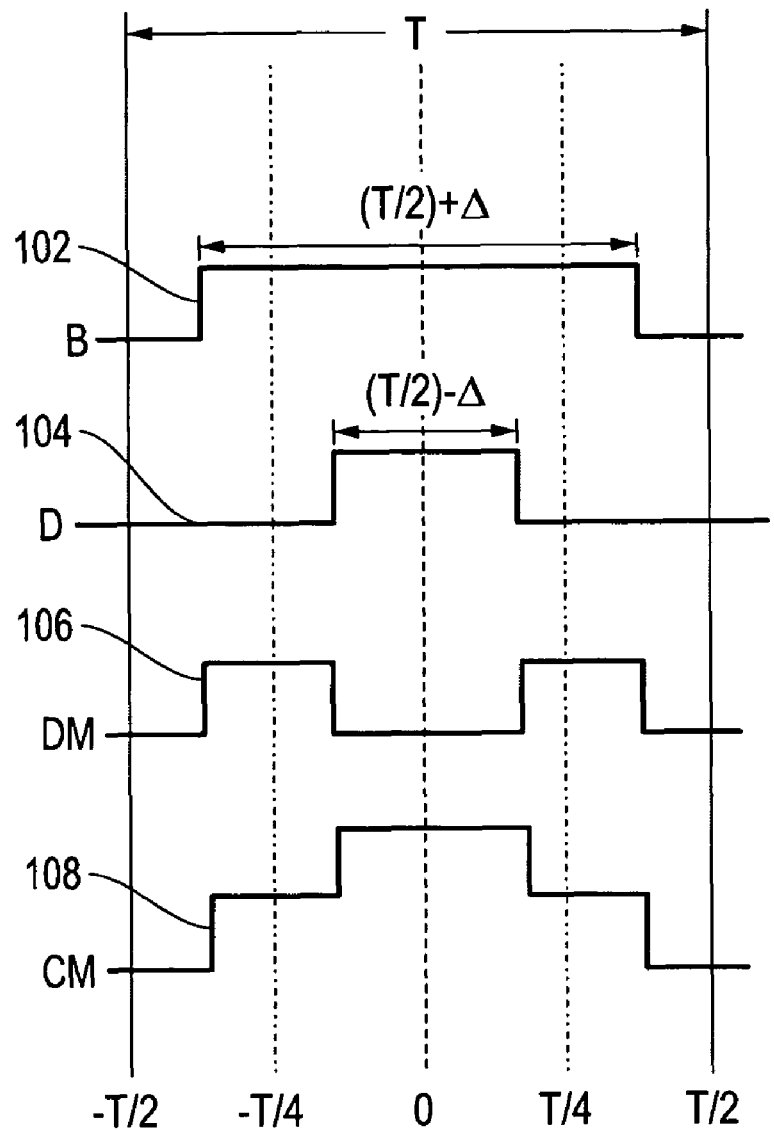
FIG. 1 is a graph of a particular representative embodiment of a conventional BD-D PWM signal where pulse widths of two pulse waves are varied, which pulse waves are time-aligned and often centered within a pulse width modulated (PWM) frame.
Figure 2:
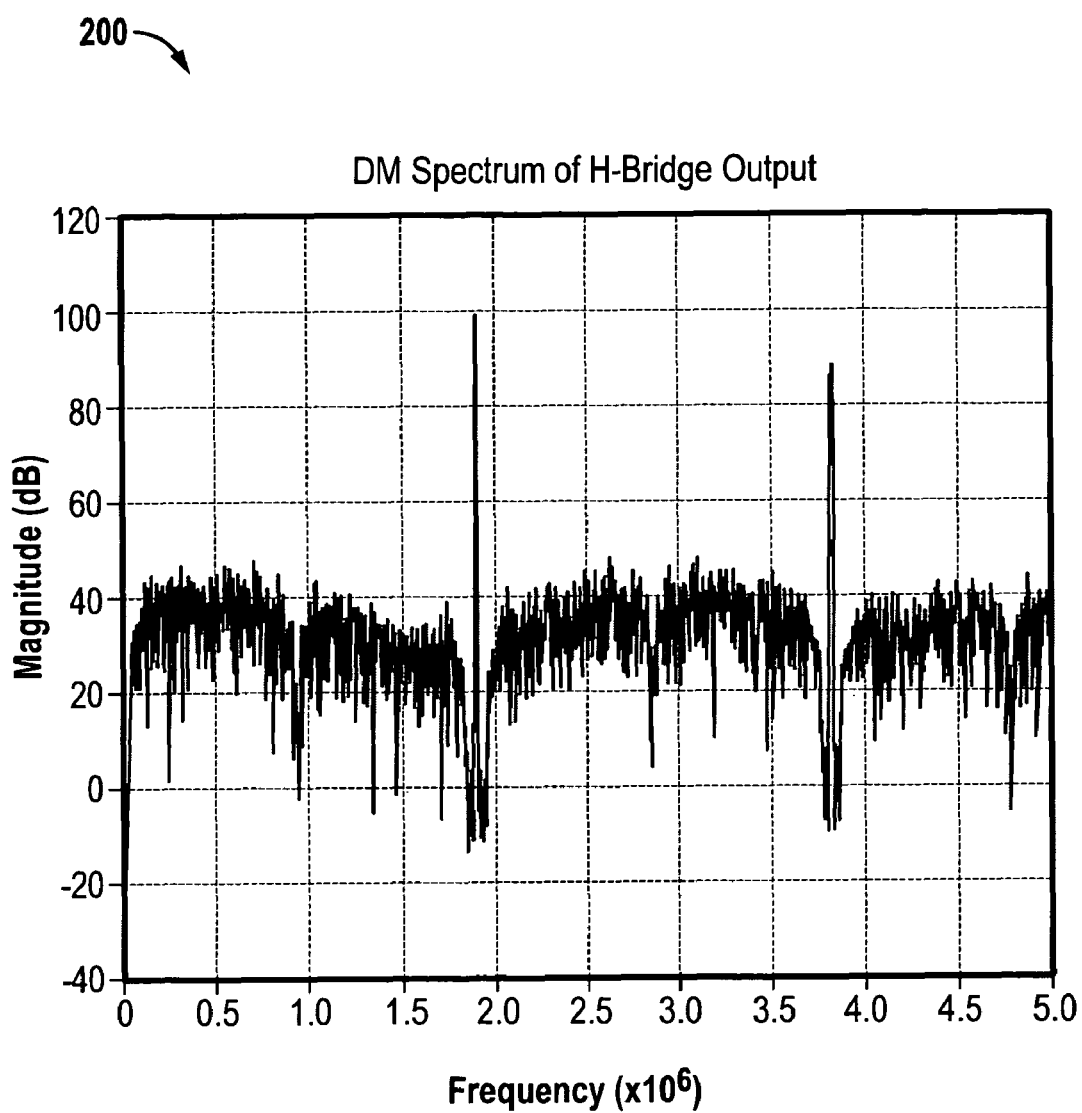
FIG. 2 is a graph of a differential mode (DM) power spectrum of the PWM signals illustrated in FIG. 1 with a time-varying delta ($\Delta$) and a frame rate of 960 kHz.
Figure 3:
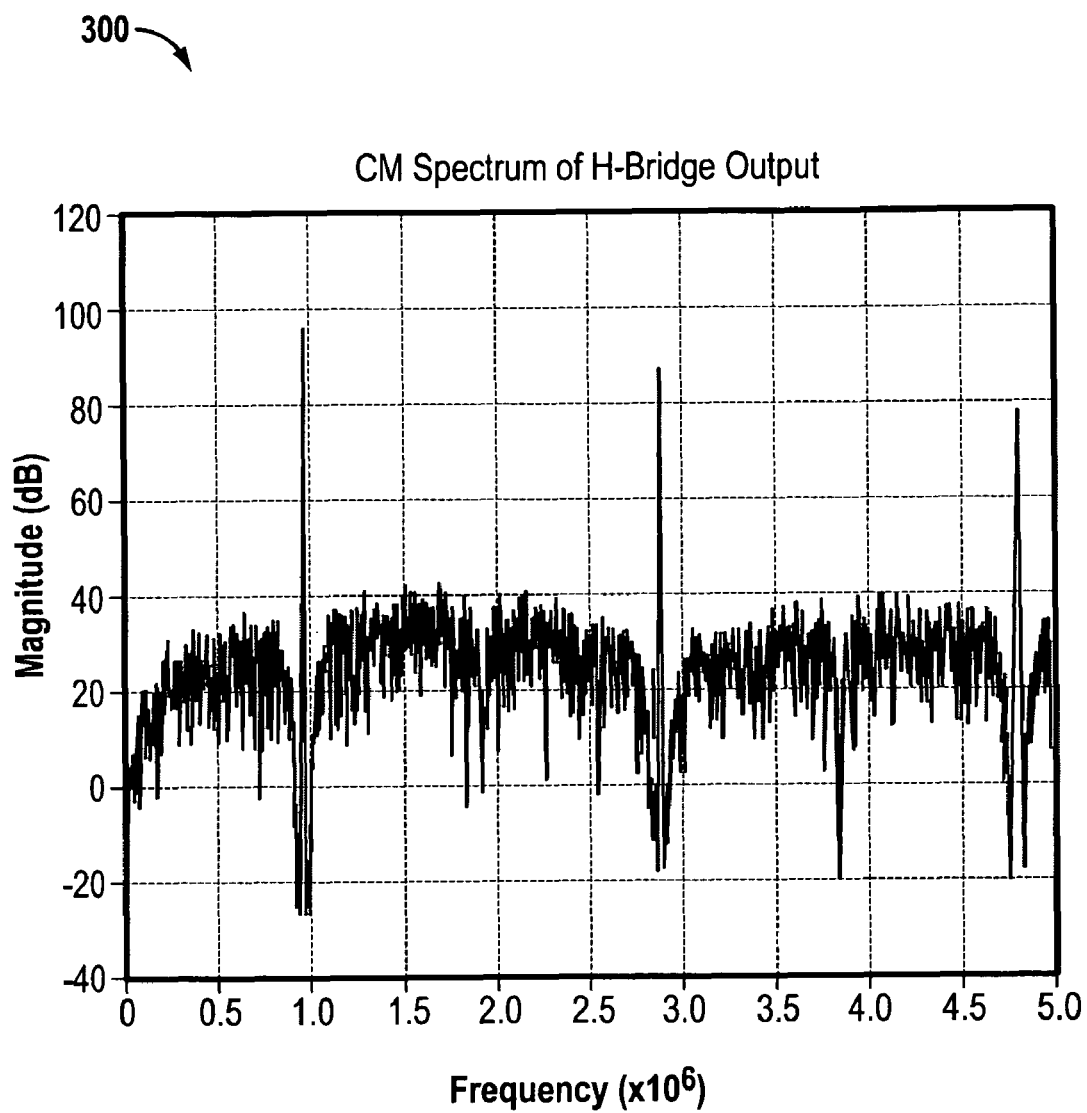
FIG. 3 is a graph of a common mode (CM) power spectrum of the PWM signals illustrated in FIG. 1 with a time-varying delta ($\Delta$) and a frame rate of 960 kHz.
Figure 9:
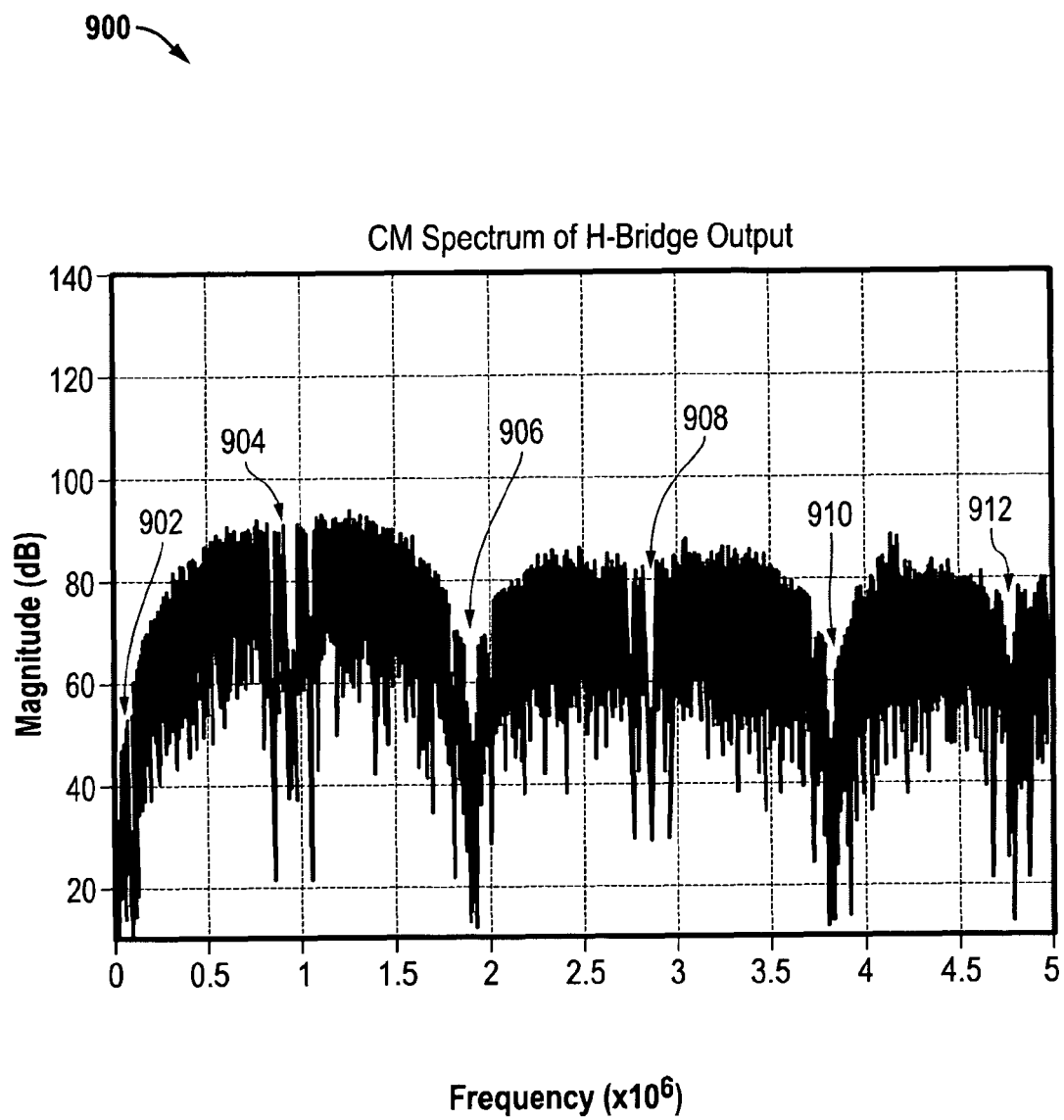
FIG. 9 is a graph of a particular illustrative example of a common mode power spectrum associated with a modulated PWM output signal produced by selectively chopping or not chopping a PWM signal and its duty cycle complement (within limits of time quantization effects) according to values of a random pulse sequence produced by a data generator, such as the sigma-delta circuit illustrated in FIG. 7.

FIG. 9 is a graph of a particular illustrative example of a power spectrum 900 of the output PWM signal 808 in FIG. 8. In this case, the programmable stop-band was set to be 200 kHz and the PWM frame rate is 960 kHz. The common mode power spectrum 900 has been spread as compared to the common mode power spectrum 300 illustrated in FIG. 3. Further, the common mode power spectrum 900 does not include large common mode components that contribute to AM interference (AMI) or electromagnetic interference (EMI). Further, the common mode power spectrum 900 includes little noise in the audio frequency band, and notches have been placed at n*960 kHz+/−200 kHz, where n is a non-negative integer, as indicated at 904, 906, 908, 910, and 912. Further, the graph 900 includes a notch at 0 kHz and at 20 kHz, as indicated at 902. In an alternate example, should the programmable stop-band be centered at 300 kHz, the notches would be located at n*960 kHz+/−300 kHz.

Figure 10:
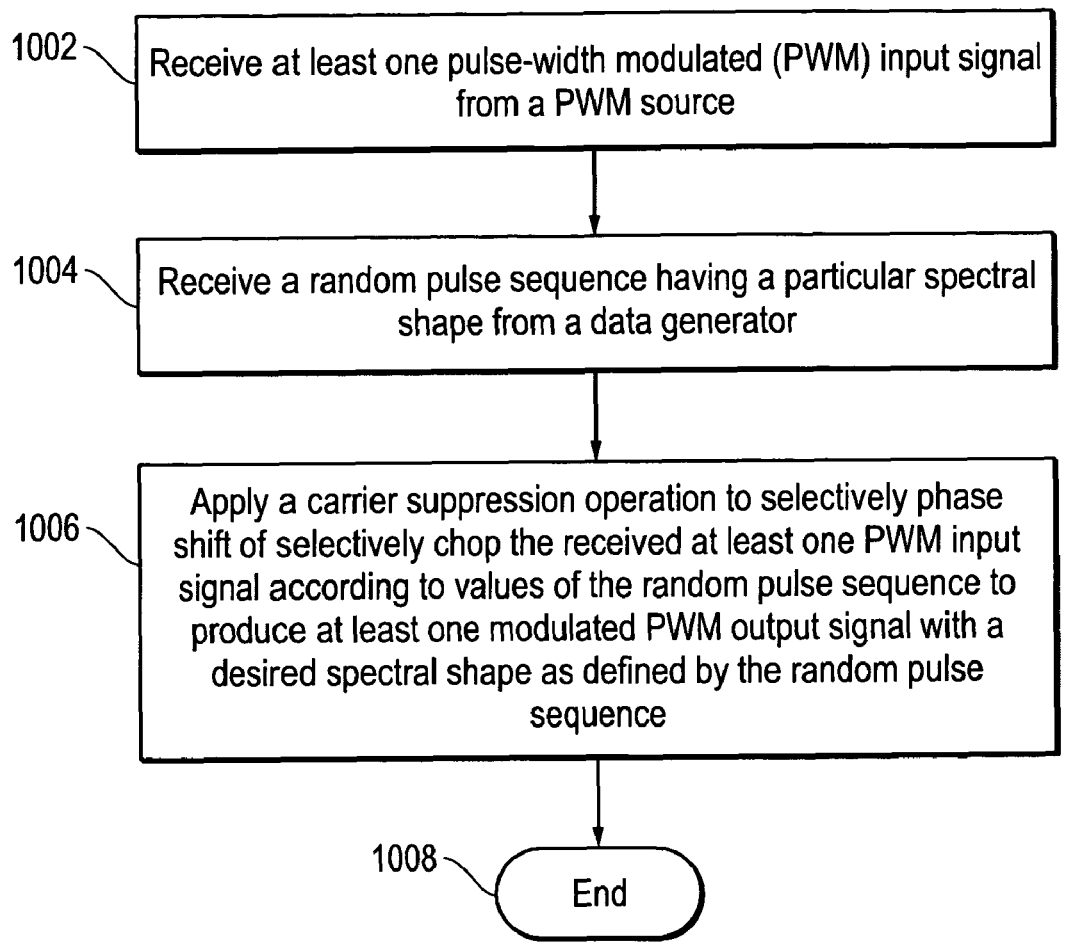
FIG. 10 is a flow diagram of a particular illustrative embodiment of a method of shaping an output power spectrum associated with at least one modulated PWM output signal.

FIG. 10 is a flow diagram of a particular illustrative embodiment of a method of shaping an output power spectrum associated with at least one modulated PWM output signal. At 1002, at least one pulse-width modulated (PWM) input signal is received from a PWM source. Continuing to 1004, a random pulse sequence having a particular spectral shape is received from a data generator 700. In a particular embodiment, the particular spectral shape includes notches at selected frequencies. Proceeding to 1006, a carrier suppression operation is applied to selectively phase shift or to selectively chop the received at least one PWM input signal according to values of the random pulse sequence to produce at least one modulated PWM output signal with a desired spectral shape as defined by the random pulse sequence. In a particular embodiment, the at least one modulated PWM output signal has carrier energy that is spread to frequencies other than a carrier frequency and its harmonics. In a particular embodiment, the carrier suppression operation can be applied at integer sub-multiples of a PWM frame repetition rate or at a rate that is faster than the frame repetition rate. The method terminates at 1008.

In a particular embodiment, the method further includes programming the data generator 700 to produce the particular spectral shape. In another particular embodiment, the data generator 700 includes a feedback loop having a programmable transfer function. In still another particular embodiment, the data generator 700 has a nominally white noise input. The data generator 700 shapes the white noise source to produce an output pulse sequence having the desired spectral shape often with notches at programmable frequency locations.

In conjunction with the systems, circuits, and methods described above with respect to FIGS. 4-10, a circuit device is disclosed that is adapted to utilize a random data sequence having a particular spectral shape to control application of a carrier suppression operation. In a particular example, a pulse edge control circuit coupled to a data generator 700 that provides a random sequence with a particular spectral shape to the pulse edge control circuit may selectively phase shift a pulse-width modulated (PWM) input signal and its PWM duty cycle complement by plus or minus a quarter of a frame width at integer sub-multiples of a frame repetition rate based on values of the random data sequence. In another particular example, the pulse edge control circuit coupled to the data generator 700 may selectively chop (i.e., chop or does not chop) at least one PWM input signal based on values of the random data sequence. In either instance, the resulting modulated PWM output has an altered carrier spectrum that has a spectral shape defined by the particular spectral shape of the random data sequence, including any frequency notches in the particular spectral shape. The resulting modulated PWM output signal has reduced carrier energy at a carrier frequency and at harmonics of the carrier frequency and exhibits reduced AM interference (AMI) and reduced electromagnetic interference (EMI) with respect to adjacent circuitry.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A circuit device, comprising:
a data generator adapted to output a random pulse sequence having a particular spectral shape, the data generator including a sigma-delta modulator that includes a zero input signal, a random noise signal, a quantizer, a noise transfer function defined within a feedback loop, and limiter circuitry coupled within the feedback loop between the output of the feedback loop and the noise transfer function;
where a feedback value output by the feedback loop of the sigma-delta modulator is subtracted from the zero input signal of the sigma-delta modulator to produce a first result prior to addition of the random noise signal to the first result to produce a second result;
where the second result is provided to the quantizer of the sigma-delta modulator to produce a random pulse sequence at an output of the sigma-delta modulator; and
where the random pulse sequence is subtracted from the first result to produce a feedback result that is provided to the noise transfer function of the sigma-delta modulator.

2. The circuit device of claim 1, wherein the limiter circuitry is configured to limit the absolute value of the output of the noise transfer function.

3. The circuit device of claim 1, wherein the quantizer is configured to produce a random pulse sequence having values of plus or minus one at an output of the sigma-delta modulator; and wherein the limiter circuitry is configured to limit the absolute value of the output of the noise transfer function to limit the absolute value of an error term in the feedback result that is provided to the noise transfer function.

4. The circuit device of claim 1, wherein the quantizer is configured to produce a random pulse sequence having values of +1 or −1 at an output of the sigma-delta modulator; and wherein the limiter circuitry is configured to limit the absolute value of the output of the noise transfer function to a value of +2 or −2 to limit the absolute value of an error term in the feedback result provided to the noise transfer function to less than or equal to 1.0.

5. The circuit device of claim 1, further comprising:
a pulse edge control circuit to selectively apply a carrier suppression operation to at least one pulse-width modulated (PWM) signal in response to the random pulse sequence to produce at least one modulated PWM output signal; and
where spectral energy associated with a PWM carrier of the modulated PWM output signal at a carrier frequency and associated harmonics is changed such that the modulated PWM output signal has a spectral shape defined by the particular spectral shape.

6. The circuit device of claim 5, wherein the particular spectral shape includes notches at specified frequencies, and wherein the spectral shape of the modulated PWM output signal includes notches at desired frequencies.

7. The circuit device of claim 5, wherein the carrier suppression operation comprises a chop operation that is selectively applied to chop or not chop the at least one PWM input signal with its duty cycle complement PWM signal according to the random pulse sequence.

8. The circuit device of claim 7, wherein the noise transfer function is programmable to create a plurality of spectral shapes, wherein at least one of the plurality of spectral shapes includes one or more notches at desired frequencies.

9. A method comprising:
providing a data generator comprising a sigma-delta modulator that includes a zero input signal, a random noise signal, a quantizer, a noise transfer function defined within a feedback loop, and limiter circuitry coupled within the feedback loop between the output of the feedback loop and the noise transfer function; and producing a random pulse sequence having a particular spectral shape from the data generator by subtracting a feedback value output by the feedback loop of the sigma-delta modulator from the zero input signal of the sigma-delta modulator to produce a first result prior to adding the random noise signal to the first result to produce a second result, providing the second result to the quantizer of the sigma-delta modulator to produce a random pulse sequence at an output of the sigma-delta modulator, subtracting the random pulse sequence from the first result to produce a feedback result, and providing the feedback result to the noise transfer function of the sigma-delta modulator.

10. The method of claim 9, further comprising limiting the absolute value of the output of the noise transfer function.

11. The method of claim 9, further comprising using the quantizer to produce a random pulse sequence having values of plus or minus one at an output of the sigma-delta modulator; and limiting the absolute value of the output of the noise transfer function to limit the absolute value of an error term in the feedback result that is provided to the noise transfer function.

12. The method of claim 9, further comprising using the quantizer to produce a random pulse sequence having values of +1 or −1 at an output of the sigma-delta modulator; and limiting the absolute value of the output of the noise transfer function to a value of +2 or −2 to limit the absolute value of an error term in the feedback result provided to the noise transfer function to less than or equal to 1.0.

13. The method of claim 9, further comprising:
receiving at least one pulse-width modulated (PWM) input signal from a PWM source; and
applying a carrier suppression operation to selectively phase shift or to selectively chop the received at least one PWM input signal according to values of the random pulse sequence to produce at least one modulated PWM output signal with a desired spectral shape as defined by the random pulse sequence.

14. The method of claim 9, wherein the particular spectral shape includes one or more notches at selected frequencies.

15. The method of claim 9, further comprising programming the noise transfer function of the data generator to produce the particular spectral shape.

16. The method of claim 9, wherein the at least one modulated PWM output signal has carrier energy that is spread to frequencies other than a carrier frequency and its harmonics.

17. The method of claim 16, further comparing applying the carrier suppression operation by selectively chopping or not chopping the at least one PWM input signal with its duty cycle complement PWM signal according to the random pulse sequence.

* * * * *